United States Patent [19]

Sawada

[11] Patent Number: 5,629,710

[45] Date of Patent: May 13, 1997

[54] APPARATUS FOR ACQUIRING THE POSITION OF A MOBILE STATION

[75] Inventor: Kensuke Sawada, Kawasaki, Japan

[73] Assignee: Fujitsu Limited, Kanagawa, Japan

[21] Appl. No.: 371,006

[22] Filed: Jan. 10, 1995

[30] Foreign Application Priority Data

Mar. 16, 1994 [JP] Japan ................. 6-045534

[51] Int. Cl.⁶ ................. G01S 3/02; G01S 1/24; H04M 11/00
[52] U.S. Cl. ................. 342/457; 342/387; 379/60
[58] Field of Search ................. 342/457, 357, 342/463, 387; 379/60

[56] References Cited

U.S. PATENT DOCUMENTS

| 5,056,106 | 10/1991 | Wang et al. ................. | 342/463 |
| 5,235,633 | 8/1993 | Dennison et al. ................. | 379/60 |
| 5,293,645 | 3/1994 | Sood ................. | 455/54.1 |
| 5,317,321 | 5/1994 | Sass ................. | 342/357 |
| 5,442,805 | 8/1995 | Sagers et al. ................. | 342/457 |
| 5,457,810 | 10/1995 | Ivanov et al. ................. | 379/60 |

FOREIGN PATENT DOCUMENTS

| 5218952 | 8/1993 | Japan . |
| 5264710 | 10/1993 | Japan . |
| 5266369 | 10/1993 | Japan . |
| 5282468 | 10/1993 | Japan . |
| 5264709 | 10/1993 | Japan . |

OTHER PUBLICATIONS

Turin, "Simulation of Urban Vehicle Monitoring Systems", IEEE Trans. on Vehicular Technology, vol. VT–21, No. 1, Feb. 1972.

*Primary Examiner*—Gregory C. Issing

[57] ABSTRACT

A position acquiring apparatus for specifying the spatial position of a mobile station is provided for a mobile communication system composed of a plurality of base stations fixed on the ground and a mobile station moving on the ground or water or in the air, whereby hand-off control can be executed at proper switching timing or diversity reception control requiring short processing time can be carried out. A receiving unit of the mobile station receives signals transmitted from the base stations, and an extracting unit extracts a predetermined synchronizing signal and an identifying signal contained in each transmitted signal. A time difference detecting unit monitors the timing at which each of the predetermined synchronizing signals is extracted by the extracting unit, to detect a time difference between each extraction timing and predetermined timing. A base station coordinates detecting unit detects position coordinate values of each of the base stations, based on the identifying signals. Based on the time differences and the position coordinate values thus obtained, a mobile station coordinates calculating unit calculates position coordinates of the mobile station.

2 Claims, 10 Drawing Sheets

1

APPARATUS FOR ACQUIRING THE POSITION OF A MOBILE STATION

BACKGROUND OF THE INVENTION (1) Field of the Invention

The present invention relates to a position acquiring apparatus for specifying the spatial position of a mobile station in a mobile communication system composed of a plurality of base stations fixed on the ground and a mobile station moving on the ground or water or in the air, or more particularly, to a position acquiring apparatus for a mobile communication system which is composed of a plurality of base stations for transmitting signals each including a predetermined synchronizing signal synchronized with an identical clock and an identifying signal identifying the originating base station, and a mobile station capable of simultaneously receiving signals transmitted from the base stations.

(2) Description of the Related Art

Recent development of mobile communication systems such as automobile radio telephone system and portable telephone system has come to demand further improvement in communication quality, as well as new added values.

Conventionally, in hand-off control wherein a mobile station switches communication from one base station to another, or in diversity reception control wherein an antenna of optimum reception condition is selected from among a plurality of antennas provided in a mobile station, the reception levels at which radio waves from base stations are received by the mobile station are used as control parameters. In the former control, if the reception level of the radio wave from a first base station with which the mobile station is communicating becomes smaller than a predetermined value, for example, the mobile station switches the communication to a second base station, the reception level of the radio wave from which is greater than the predetermined value, and the terminal of the opposite party in a fixed network also switches the connection from the first to the second base station. In the latter control, the mobile station receives the radio wave from an identical base station via a plurality of antennas provided therein, and continually selects an antenna of the highest reception level so that the selected antenna is used for the communication.

As shown in FIG. 10, however, a radio wave transmitted from a base station 101 can reach a mobile station 102 directly via a path 103 and also indirectly via pathes 105 and 107; namely, the radio wave may be diffracted by an obstacle 104 (path 105) or be reflected at an obstacle 106 (path 107) before reaching the mobile station 102. In such environment, as the mobile station 102 moves, the reception levels fluctuate drastically.

Thus, if hand-off control is performed based on such largely fluctuating reception levels, the terminal of the opposite party may select an erroneous base station, lowering the communication quality. To properly carry out diversity reception control based on greatly fluctuating reception levels, complicated control algorithm is required, which leads to prolonged processing time.

SUMMARY OF THE INVENTION

A first object of the present invention is to provide an apparatus for acquiring the position of a mobile station wherein hand-off control can be performed at proper switching timing, and a second object is to provide an apparatus for acquiring the position of a mobile station which permits diversity reception control requiring short processing time.

To achieve the above objects, the present invention provides an apparatus for acquiring the position of a mobile station in a mobile communication system which includes a plurality of base stations for transmitting signals each including a predetermined synchronizing signal synchronized with an identical clock and an identifying signal identifying an originating base station, and a mobile station capable of simultaneously receiving signals transmitted from any near base stations. The apparatus comprises receiving means provided in the mobile station, for receiving signals transmitted from the base stations, extracting means for extracting the predetermined synchronizing signal and the identifying signal contained in each transmitted signal, time difference detecting means for detecting a time difference between timing at which each of the predetermined synchronizing signals is extracted by the extracting means and predetermined timing, base station coordinates detecting means for detecting position coordinate values of each of the base stations, based on the identifying signals from the base stations extracted by the extracting means, and mobile station coordinates calculating means for calculating position coordinates of the mobile station, based on the time differences detected by the time difference detecting means and the position coordinate values detected by the base station coordinates detecting means.

The above and other objects, features and advantages of the present invention will become apparent from the following description when taken in conjunction with the accompanying drawings which illustrate preferred embodiments of the present invention by way of example.

DESCRIPTION OF THE PREFERRED EMBODIMENTS

An embodiment according to the present invention will be outlined first.

Figure 1:
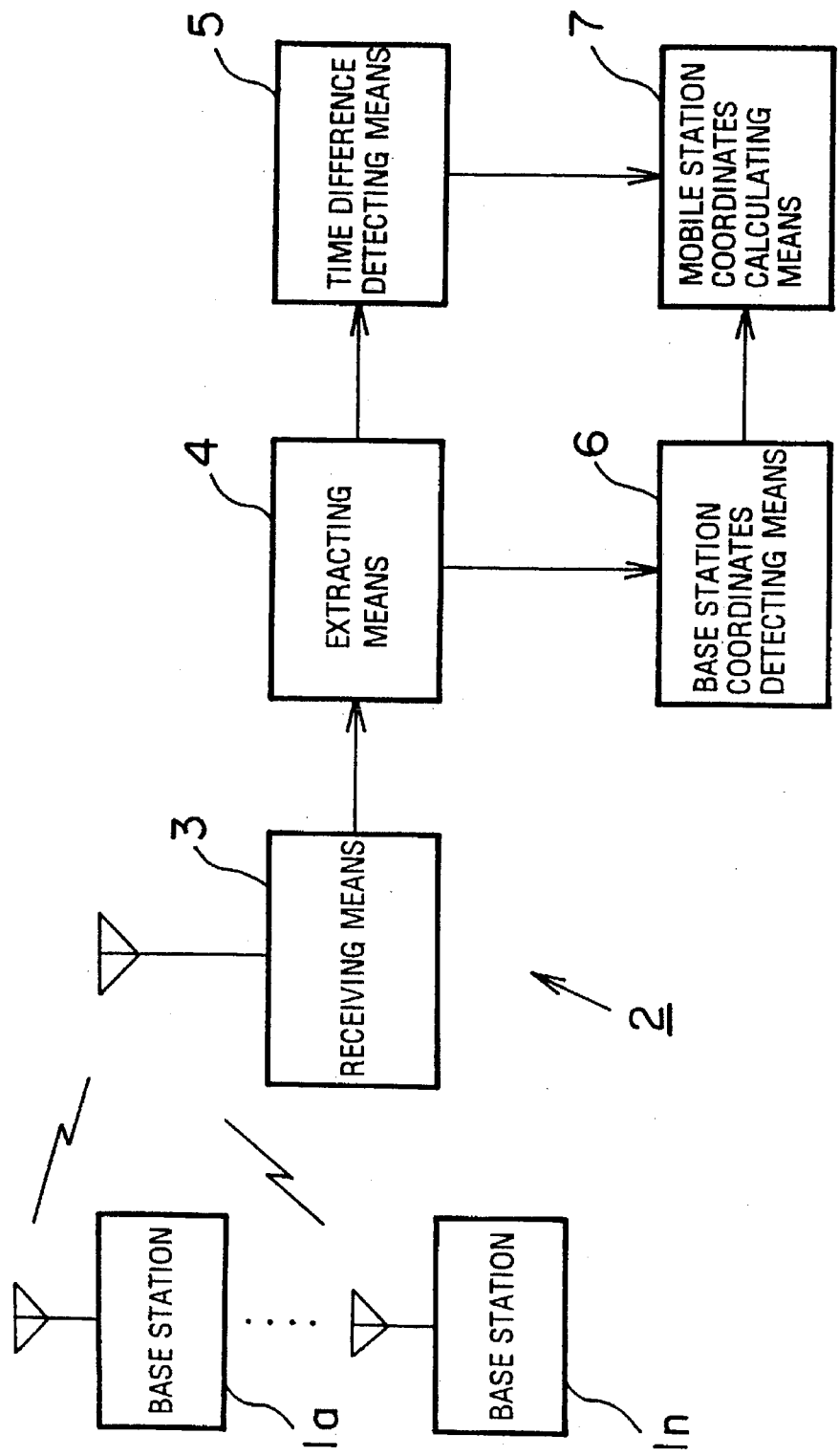
FIG. 1 is a diagram illustrating the principles of the present invention.

As shown in FIG. 1, the present invention provides an apparatus for acquiring the position of a mobile station in a mobile communication system which comprises a plurality of base stations 1a to 1n for transmitting signals each including a predetermined synchronizing signal synchronized with an identical clock and an identifying signal identifying the originating base station, and a mobile station 2 capable of simultaneously receiving signals transmitted from the base stations 1a to 1n.

This position acquiring apparatus comprises receiving means 3 provided in the mobile station 2 for receiving signals transmitted from the base stations 1a to 1n, extracting means 4 for extracting the predetermined synchronizing signal and the identifying signal contained in each transmitted signal, time difference detecting means 5 for detecting a time difference between timing at which each of the predetermined synchronizing signals is extracted by the extracting means 4 and predetermined timing, base station coordinates detecting means 6 for detecting position coordinate values of each of the base stations 1a to 1n, based on the identifying signals from the base stations 1a to 1n extracted by the extracting means 4, and mobile station coordinates calculating means 7 for calculating position coordinates of the mobile station 2, based on the time differences detected by the time difference detecting means 5 and the position coordinate values detected by the base station coordinates detecting means 6.

In the above arrangement, the receiving means 3 of the mobile station 2 receives signals transmitted from the base stations 1a to 1n, and the extracting means 4 extracts the predetermined synchronizing signal and the identifying signal contained in each transmitted signal. At this time, the time difference detecting means 5 monitors the timing at which each of the predetermined synchronizing signals is extracted by the extracting means 4, to detect the time difference between the extraction timing and the predetermined timing. On the other hand, the base station coordinates detecting means 6 detects the position coordinate values of each of the base stations 1a to 1n, based on the identifying signals of the base stations 1a to 1n extracted by the extracting means 4.

Based on the time differences detected by the time difference detecting means 5 and the position coordinate values detected by the base stallion coordinates detecting means 6, the mobile station coordinates calculating means 7 calculates the position coordinates of the mobile station 2.

Since the position coordinates of the mobile station 2 are obtained in this manner, a base station most suited for the communication with the mobile station 2 can be easily determined based on the obtained position coordinates, thus permitting hand-off control not solely dependent upon the signal reception levels.

Also, the moving speed of the mobile station 2 is obtained based on time-based change in the position coordinates of the mobile station 2, and since the moving speed of the mobile station 2 and time-based fluctuation pitch of reception level due to fading have a proportional relationship, the fluctuation pitch of reception level can be obtained based on the moving speed of the mobile station 2. Using the thus-obtained fluctuation pitch, an equalization time is determined, and the reception level is equalized within the equalization time, to obtain a reception level. Since the reception level obtained in this manner does not fluctuate with time due to fading, diversity reception control requiring short processing time is available.

The embodiment of the present invention will be now described in detail.

Figure 2:
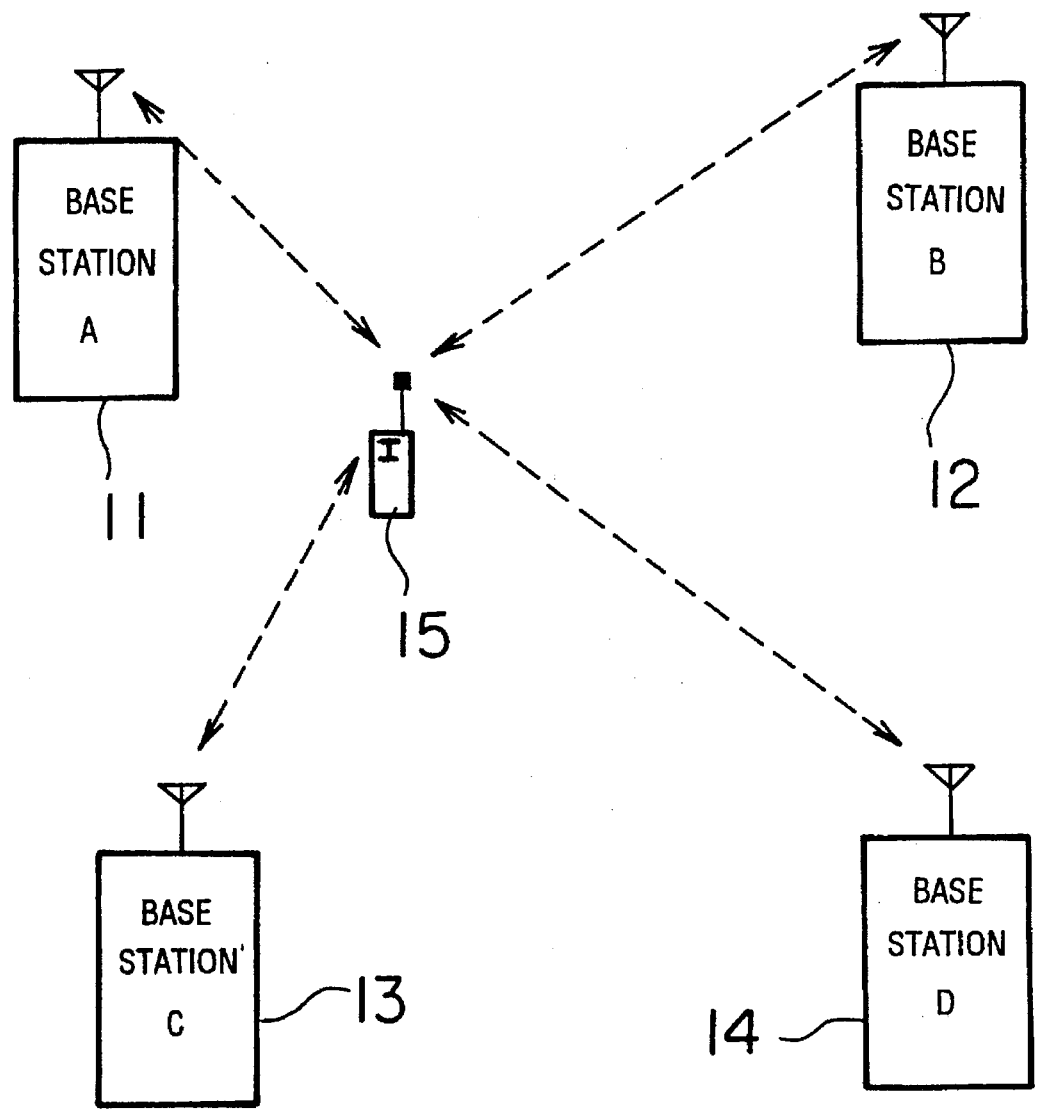
FIG. 2 is a diagram showing the entire configuration of a mobile communication system in which an apparatus for acquiring the position of a mobile station according to the present invention is provided.

FIG. 2 illustrates the entire configuration of a mobile communication system in which the apparatus for acquiring the position of a mobile station according to the present invention is provided. Specifically, the mobile communication system comprises at least four base stations 11 to 14 fixed on the ground, and a mobile station 15 moving on the ground or water or in the air and capable of simultaneously receiving signals transmitted from the base stations 11 to 14. This mobile communication system uses a DS/SS (Direct Sequence/Spread Spectrum) signal obtained by subjecting transmitting data to second-order modulation by means of a spreading code (PN code). The base stations 11 to 14 have clocks individually perfectly synchronized with a master clock, and DS/SS signals transmitted from the base stations 11 to 14 contain predetermined synchronizing signals (spreading codes) synchronized with the respective clocks. The spreading codes differ from one base station to another and each consist of, e.g., several hundreds of bits, which are subjected to modulation of one bit of transmitting data. Since the base stations are assigned respective different spreading codes, the spreading codes can be used as identification codes for identifying the individual base stations.

Figure 3:
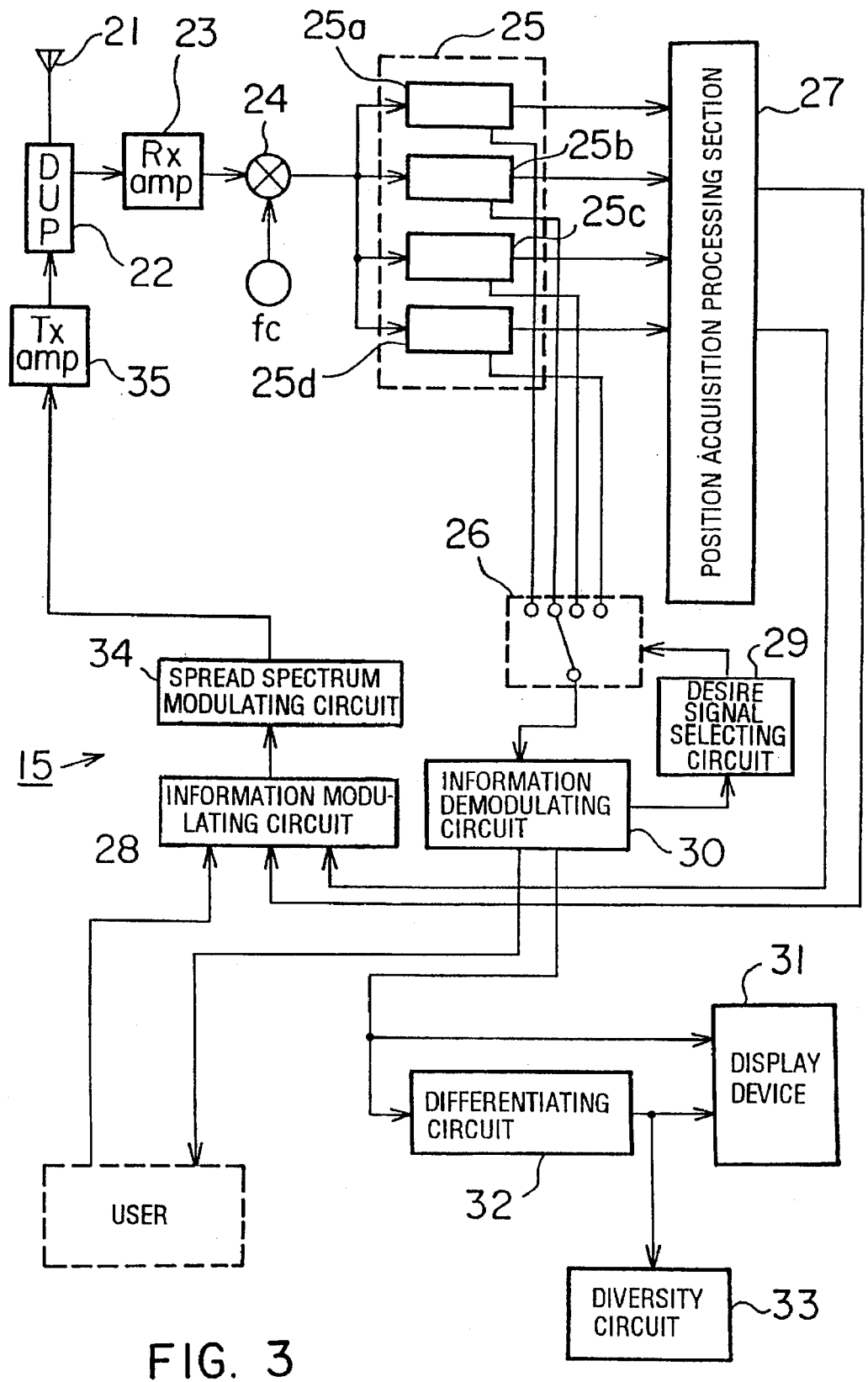
FIG. 3 is a diagram showing the internal arrangement of a mobile station.

FIG. 3 illustrates the internal arrangement of the mobile station 15. In FIG. 3, signals transmitted from base stations and received by an antenna 21 are supplied via a duplexer 22, a received signal amplifying section 23, and a phase detector 24 to a spread spectrum demodulating circuit 25. The phase detector 24 demodulates the input DS/SS signals to base-band DS/SS signals by using a carrier wave (fc). The spread spectrum demodulating circuit group 25 is composed of, e.g., four independent spread spectrum demodulators 25a to 25d. The spread spectrum demodulators 25a to 25d perform spreading code demodulation on respective spread spectrum modulated signals from four nearby base stations, output from the phase detector 24, by using spreading codes generated by PN code generators respectively built therein, and output the demodulated data to a switch 26. Further, the spread spectrum demodulators 25a to 25d each detect the predetermined synchronizing signal from the corresponding spreading code-demodulated signal, and supplies the detected signal to a position acquisition processing section 27. Also, each spread spectrum demodulator supplies the position acquisition processing section 27 with the spreading code which is supplied thereto when the predetermined synchronizing signal is detected. The internal arrangement of the spread spectrum demodulators 25a–25d will be explained in detail.

Figure 4:
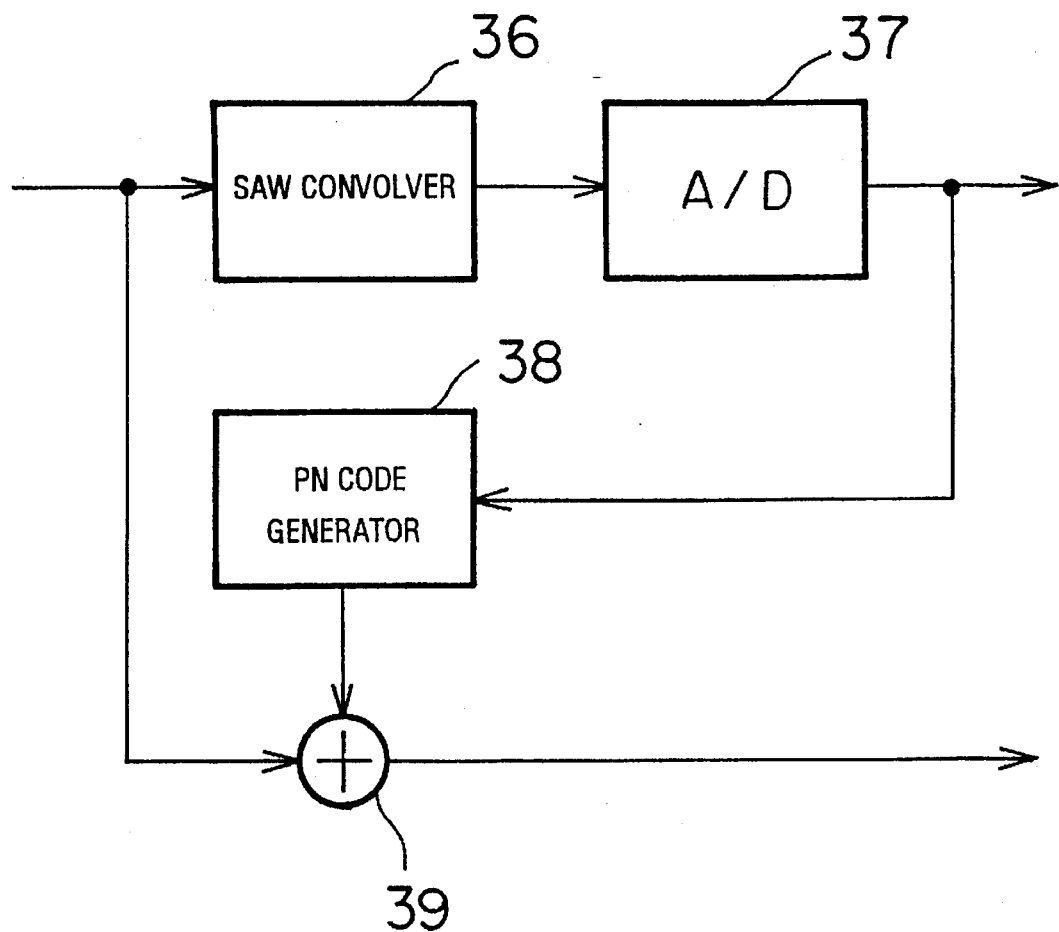
FIG. 4 is a diagram showing the internal arrangement of a spread spectrum demodulator.

FIG. 4 is a block diagram showing the internal arrangement of the spread spectrum demodulators 25a–25d in detail. The spread spectrum demodulators have an identical arrangement. A SAW convolver 36, which is a surface acoustic wave device, processes the DS/SS signal to extract a peak signal thereof, which is converted to a digital signal by an A/D converter 37 and then supplied to the position acquisition processing section 27. Also, a synchronizing signal for spreading code generation is obtained from the output of the A/D converter 37, and is supplied to a PN code generator 38. The PN code generator 38 generates a spreading code for the corresponding base station, based on the synchronizing signal supplied thereto, and outputs the generated code to an exclusive-OR circuit 39. The exclusive-OR circuit 39 is also supplied with the base-band DS/SS signal; accordingly, the exclusive-OR circuit 39 derives exclusive-OR data based on the DS/SS signal and the spreading code, and outputs the result to the switch 26.

The SAW convolver 36 and the PN code generator 38 may be constituted by a processor such that the functions of the elements 36 and 38 are implemented by software.

Referring again to FIG. 3, the position acquisition processing section 27 comprises a processor including counters, storage section, input/output section, etc., obtains a time difference between the detection timing of each of the predetermined synchronizing signals and predetermined timing, and supplies the time differences, along with the spreading codes, to an information modulating circuit 28. The position acquisition processing section 27 will be described in detail later with reference to FIG. 5.

The switch 2 6 operates according to switching control executed by a desire signal selecting circuit 29, and permits one of the four outputs from the spread spectrum demodulators 25a–25d to be supplied to an information demodulating circuit 30. The information demodulating circuit 30 performs separation of multiplexed signals; among the separated items of data, user information directed to the user of this mobile station is output to the outside, line control data indicating one of the four base stations from which data is to be received is supplied to the desire signal selecting circuit 29, and data transmitted from a base station, described later, and representing the position coordinate values of this mobile station is supplied to a display device 31 and a differentiating circuit 32. The output of the differentiating circuit 32 is supplied to a diversity circuit 33 and the display device 31. The display device 31, the differentiating circuit 32, and the diversity circuit 33 will be explained later.

User information from the user of this mobile station is input to the info,nation modulating circuit 28, which then combines the user information with the time difference data and spreading code supplied from the position acquisition processing section 27, and supplies the-thus multiplexed signal to a spread spectrum modulating circuit 34. The spread spectrum modulating circuit 34 performs spreading code modulation based on a spreading code assigned to this mobile station, the modulated signal being supplied to the antenna 21 via a transmitting signal amplifying section 35 and the duplexer 22 and transmitted from the antenna 21.

Thus, the time difference data and spreading codes output from the position acquisition processing section 27 are transmitted to the base stations, which then calculate the position coordinates of the mobile station. The calculated position coordinate data of the mobile station is returned to the mobile station 15 and is supplied to the display device 31 and the differentiating circuit 32. The differentiating circuit 32 obtains the speed of movement of the mobile station, based on change in the position coordinate date with time, and supplies the moving speed thus obtained to the diversity circuit 33 and the display device 31. The display device 31 displays a map, along with the position of this mobile station marked thereon according to the position coordinate data, and also displays the moving speed. The diversity circuit 33 obtains a fluctuation pitch of reception level of the wave received from the base station, based on the moving speed of this mobile station, determines an equalization time in accordance with the thus-obtained fluctuation pitch, and equalizes the reception level within the equalization time. Based on the reception level obtained, in this manner, the diversity circuit 33 carries out diversity reception control. The equalized reception level does not fluctuate with time due to fading, thus permitting diversity reception control requiring short processing time.

Figure 5:
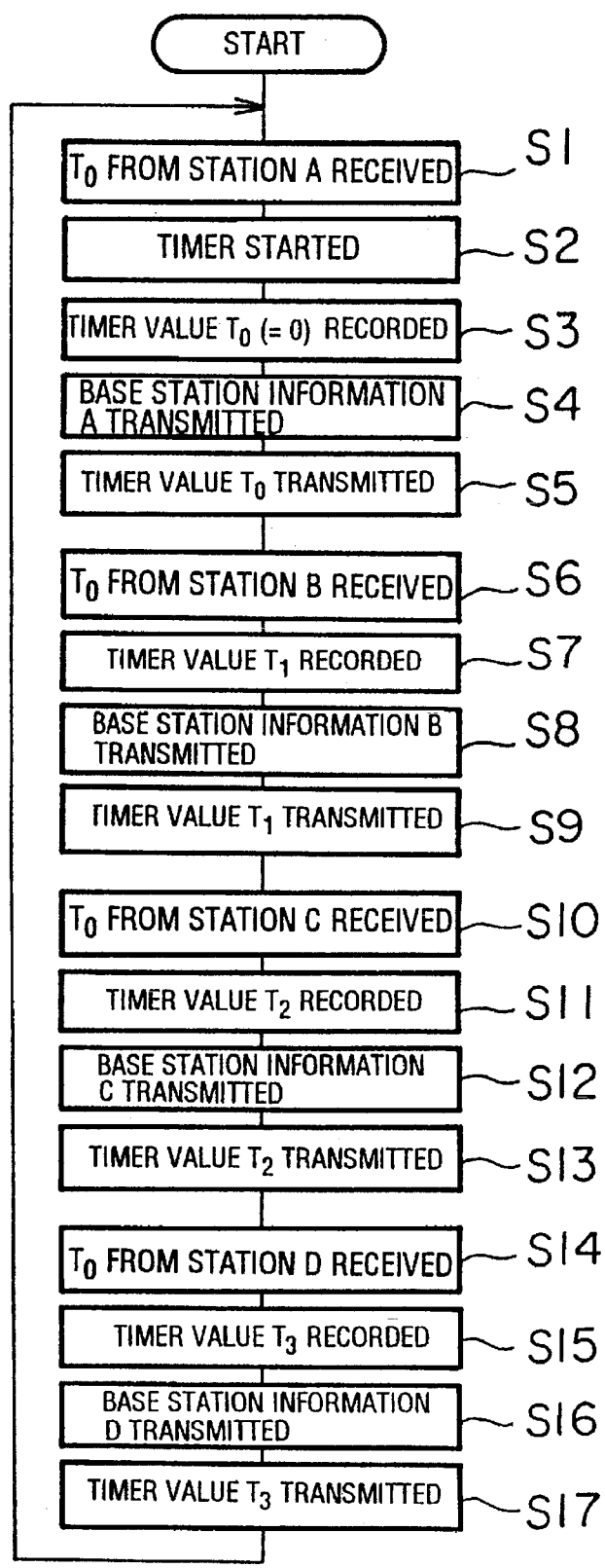
FIG. 5 is a flowchart showing the operation of a position acquisition processing section.

FIG. 5 is a flowchart showing the operation of the position acquisition processing section 27. The operation will be explained in order of step numbers.

[S1] First, the predetermined synchronizing signal t0 from a base station A, which is nearest to the mobile station 15 among the four base stations 11 to 14, is received from the spread spectrum demodulating circuit 25.

[S2] On reception of the first predetermined synchronizing signal $t_0$, a timer is started from zero. The timer is constituted by a counter for counting the individual bits of the spreading code.

[S3] The timer value $T_0$ retained by the timer when the predetermined synchronizing signal $t_0$ is received is recorded in the storage section. The timer value $T_0$, in this case, is naturally zero. Timing at which the predetermined synchronizing signal $t_0$ from the base station A is received in Step S1 corresponds to the aforementioned predetermined timing.

[S4] Information on the base station A corresponding to the predetermined synchronizing signal $t_0$, that is, the spreading code assigned to the base station A for identification, is received from the spread spectrum demodulating circuit 25, and is output to the information modulating circuit 28.

[S5] The timer value $T_0$ recorded in the storage section in Step S3 is output to the information modulating circuit 28.

[S6] The predetermined synchronizing signal $t_0$ from a base station B, which is the second nearest to the mobile station 15 among the four base stations 11 to 14, is received from the spread spectrum demodulating circuit 25.

[S7] A timer value $T_1$ retained by the timer when the predetermined synchronizing signal $t_0$ is received in Step S6 is recorded in the storage section. This timer value $T_1$ represents a difference in time between the timing at which the predetermined synchronizing signal $t_0$ from the base station A is received in Step S1 and the timing at which the predetermined synchronizing signal $t_0$ from the base station B is received in Step S6.

[S8] Information on the base station B corresponding to the predetermined synchronizing signal to received in Step S6, that is, the spreading code assigned to the base station B, is received from the spread spectrum demodulating circuit 25, and is output to the information modulating circuit 28.

[S9] The timer value $T_1$ recorded in the storage section in Step S7 is output to the information modulating circuit 28.

[S10] The predetermined synchronizing signal $t_0$ from a base station C, which is the third nearest to the mobile station 15 among the four base stations 11 to 14, is received from the spread spectrum demodulating circuit 25.

[S11] A timer value $T_2$ retained by the timer when the predetermined synchronizing signal $t_0$ is received in Step S10 is recorded in the storage section. This timer value $T_2$ represents a difference in time between the timing at which the predetermined synchronizing signal $t_0$ from the base station A is received in Step S1 and the timing at which the predetermined synchronizing signal $t_0$ from the base station C is received in Step S10.

[S12] Information on the base station C corresponding to the predetermined synchronizing signal $t_0$ received in Step S10, that is, the spreading code assigned to the base station C, is received from the spread spectrum demodulating circuit 25, and is output to the information modulating circuit 28.

[S13] The timer value $T_2$ recorded in the storage section in Step S11 is output to the information modulating circuit 28.

[S14] The predetermined synchronizing signal to from a base station D, which is the fourth nearest to the mobile station 15 among the four base stations 11 to 14, is received from the spread spectrum demodulating circuit 25.

[S15] A timer value $T_3$ retained by the timer when the predetermined synchronizing signal $t_0$ is received in Step S14 is recorded in the storage section. This timer value $T_3$ represents a difference in time between the timing at which the predetermined synchronizing signal $t_0$ from the base station A is received in Step S1 and the timing at which the predetermined synchronizing signal $t_0$ from the base station D is received in Step S14.

[S16] Information on the base station D corresponding to the predetermined synchronizing signal $t_0$ received in Step S14; that is, the spreading code assigned to the base station D, is received from the spread spectrum demodulating circuit 25, and is output to the information modulating circuit 28.

[S17] The timer value $T_3$ recorded in the storage section in Step S15 is output to the information modulating circuit 28.

Figure 6:
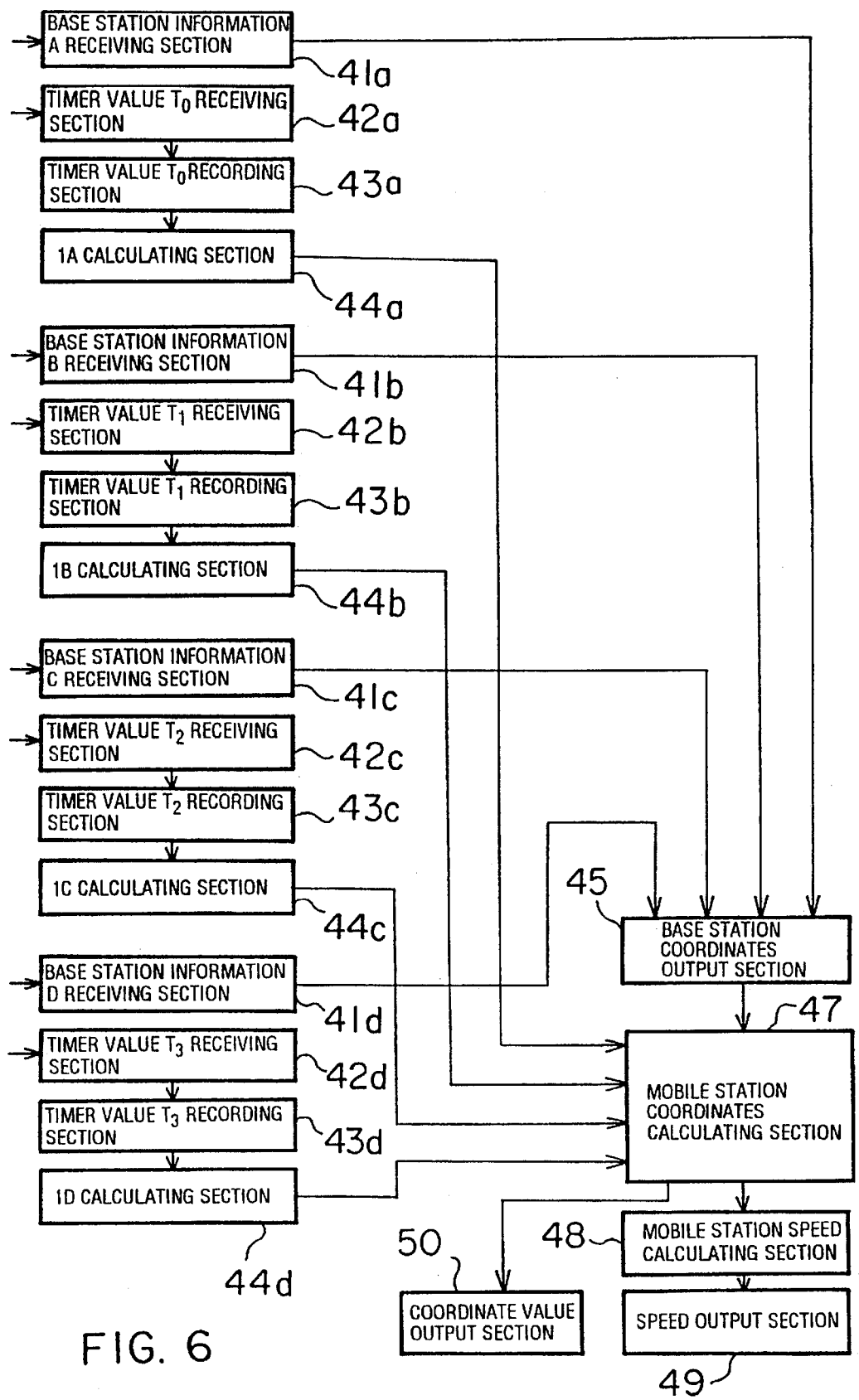
FIG. 6 is a diagram schematically illustrating functions of a position acquiring apparatus in a base station.

The time difference data and base station information transmitted from the mobile station as mentioned above are processed by a position acquiring apparatus on the base station side, as follows:

FIG. 6 schematically illustrates the functions of the position acquiring apparatus provided on the base station side. This position acquiring apparatus comprises a processor and is incorporated in at least one of the four base stations 11 to 14. FIG. 6 illustrates the functions achieved by the processor.

Specifically, the modulated signal transmitted from the mobile station is demodulated at the base station, and from this demodulated signal are extracted the time difference data $T_0$, $T_1$, $T_2$ and $T_3$ and the spreading codes or base station information A, B, C and D transmitted from the position acquisition processing section 27 of the mobile station.

The base station information A, B, C and D are supplied to receiving sections 41a, 41b, 41c and 41d associated with the base station information A, B, C and D, respectively, and the time difference data $T_0$, $T_1$, $T_2$ and $T_3$ are supplied to timer value receiving sections 42a, 42b, 42c and 42d, respectively. On receiving the base station information A, B, C and D, the base station information receiving sections 41a, 41b, 41c and 41d supply the received information to a base station coordinates output section 45.

On receiving the time difference data $T_0$, $T_1$, $T_2$ and $T_3$, the timer value receiving sections 42a, 42b, 42c and 42d supply the received data to respective timer value recording sections 43a, 43b, 43c and 43d to be stored therein. Calculating sections 44a, 44b, 44c and 44d for calculating distances $1_A$, $1_B$, $1_C$ and $1_D$, respectively, read out the time difference data $T_0$, $T_1$, $T_2$ and $T_3$ respectively stored in the timer value recording sections 43a, 43b, 43c and 43d, and multiply the time difference data $T_0$, $T_1$, $T_2$ and $T_3$ individually by the light velocity, to obtain distances $1_A$, $1_B$, $1_C$ and $1_D$, which are then output to a mobile station coordinates calculating section 47.

The base station coordinates output section 45 stores a correlation table in which the spreading codes of all base stations in the system are correlated with position coordinate values of the base stations. The base station coordinates output section 45 reads from the correlation table position coordinate values $(x_A, y_A, z_A)$, $(x_B, y_B, z_B)$, $(x_C, y_C, z_C)$ and $(x_D, y_D, z_D)$ respectively corresponding to the base station information A, B, C and D represented by the spreading codes, and output the read data to the mobile station coordinates calculating section 47.

Figure 7:
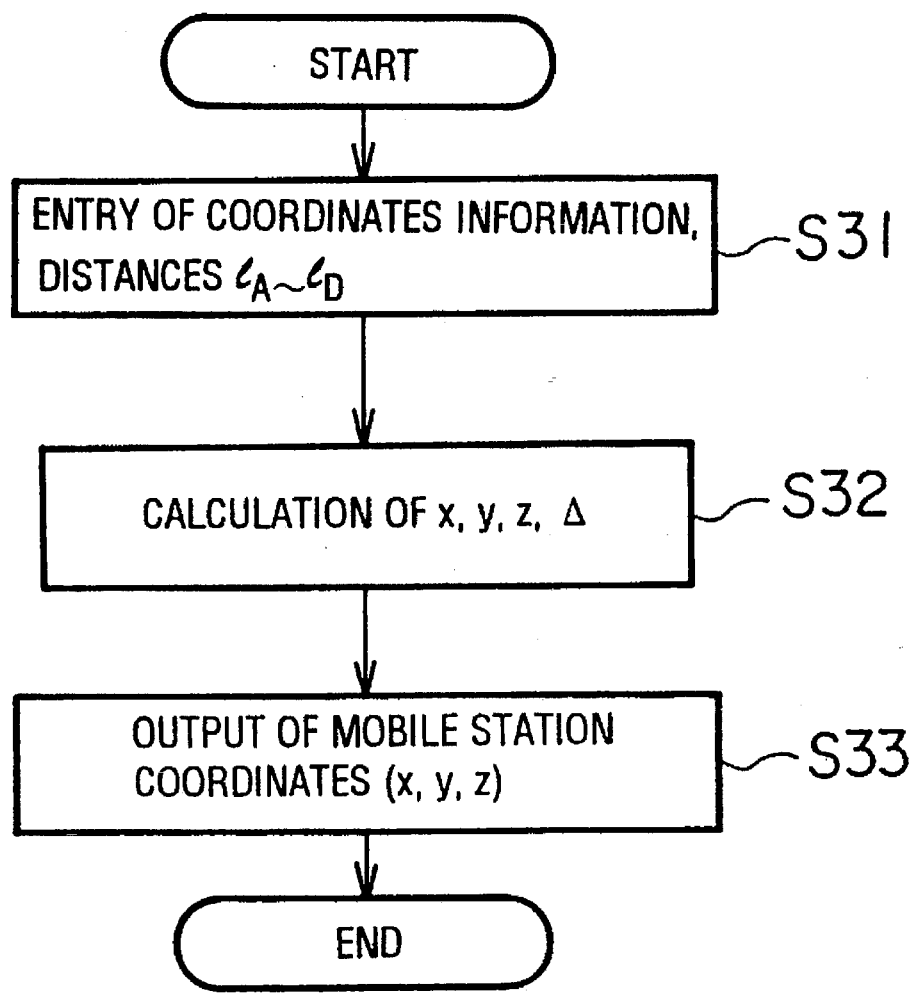
FIG. 7 is a flowchart showing the operation of a mobile station coordinates calculating section.

FIG. 7 is a flowchart showing the operation of the mobile station coordinates calculating section 47. The mobile station coordinates calculating section 47 calculates the position coordinate values etc. of the mobile station. The chart will be explained in order of step numbers.

[S31] The position coordinate values $(x_A, y_A, z_A)$, $(x_B, y_B, z_B)$, $(x_C, y_C, z_C)$ and $(x_D, y_D, z_D)$ and distances $1_A$, $1_B$, $1_C$ and $1_D$ of the respective base stations are received.

[S32] Using these values, position coordinates (x, y, z) and offset distance $\Delta$ of the mobile station are derived according to the following equations (1) to (4) such that the derived position coordinates and offset distance simultaneously satisfy equations (1) through (4):

$$(x-x_A)^2+(y-y_A)^2+(z-z_A)^2=(1_A+\Delta)^2 \quad (1)$$

$$(x-x_B)^2+(y-y_B)^2+(z-z_B)^2=(1_B+\Delta)^2 \quad (2)$$

$$(x-x_C)^2+(y-y_C)^2+(z-z_C)^2=(1_C+\Delta)^2 \quad (3)$$

$$(x-x_D)^2+(y-y_D)^2+(z-z_D)^2=(1_D+\Delta)^2 \quad (4)$$

[S33] The calculated position coordinates (x, y, z) of the mobile station are output to a mobile station speed calculating section 48 and a coordinate value output section 50.

Referring again to FIG. 6, the mobile station speed calculating section 48 calculates the moving speed, as well as the moving direction, of the mobile station based on time-based change in the position coordinates (x, y, z) of the mobile station, and outputs the calculated data to a speed output section 49.

The coordinate value output section 50 outputs the position coordinate values of the mobile station, and the speed output section 49 outputs the moving speed of the mobile station. The position coordinate values of the mobile station are modulated at the base station, and then transmitted to the corresponding mobile station. Also, the base station transmits the data representing the position coordinates and moving speed of the mobile station to a control station which performs line control of the individual base stations. The control station utilizes the data supplied thereto for radio line control such as hand-off control, radio channel allocation control, etc. For example, since the control station retains data about the locations where the individual base stations are installed, it can relate the position, moving direction and moving speed of the mobile station with the locations of the base stations, whereby switching of base stations can be carried out at appropriate timing. Even in cases where the mobile station is in an environment in which the reception levels are liable to fluctuate, hand-off control not solely dependent upon the reception levels can be carried out, thus permitting base stations to be switched at proper timing.

The accuracy of the position coordinates of the mobile station detectable by the position acquiring apparatus according to the present invention will be now explained.

Figure 8:
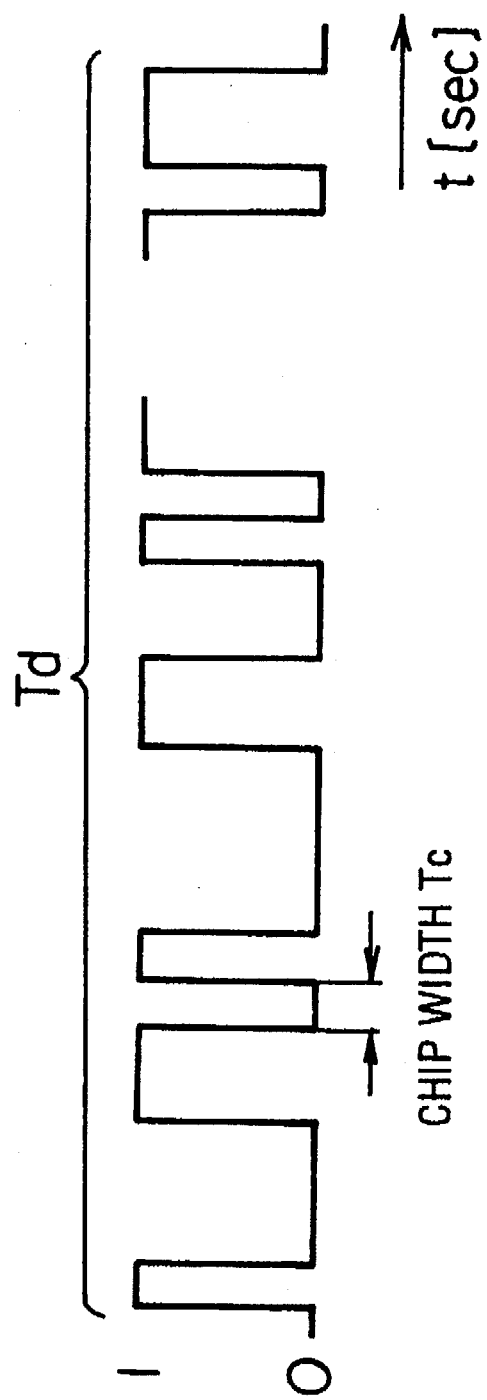
FIG. 8 is a diagram showing a DS/SS signal form.

FIG. 8 shows the form of a DS/SS signal which is obtained by modulating one bit of transmitting data by using a spreading code having a code length of N bits. Chip width Tc represents the width of one bit of the spreading code, and data width Td represents the width of one bit of transmitting data, i.e., the reciprocal number of the bit rate of transmitting data.

The measurement accuracy of the position coordinates of the mobile station by means of the DS/SS signal depends on the chip width Tc (sec). Namely, the value of the timer (counter) in the position acquisition processing section 27 shown in FIG. 3 is obtained by counting the number of bits forming the spreading code, as mentioned above, and accordingly, the bit width or the chip width Tc determines the measurement accuracy.

The chip width Tc can be expressed in terms of the data width Td and the code length N (bits) of the spreading code, as indicated by the following equation (5):

$$T_c = T_d/N \quad (5)$$

Figure 9:
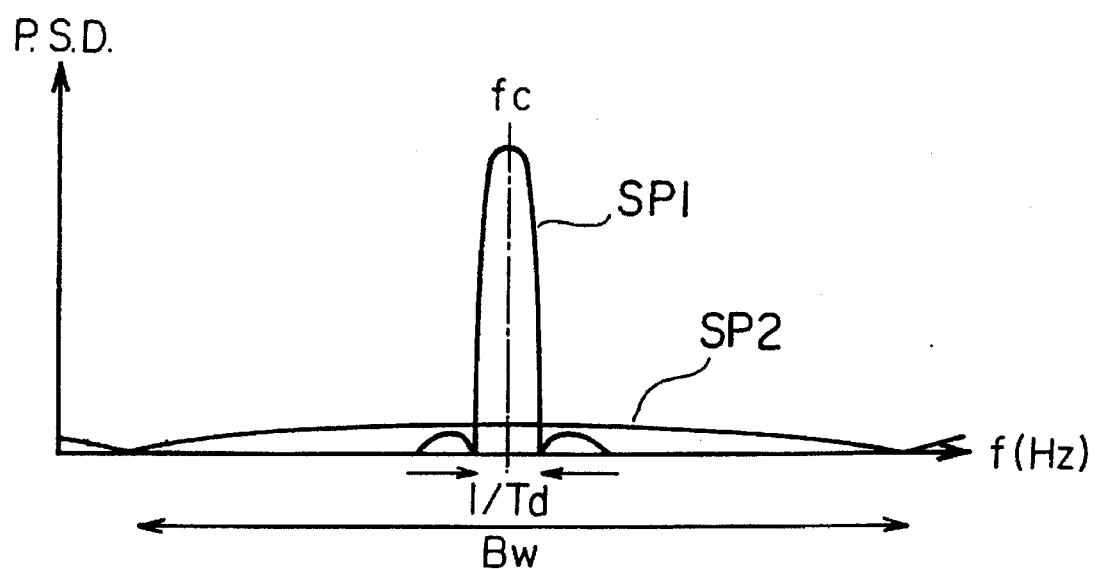
FIG. 9 is a graph showing the spectrum form of the DS/SS signal.
Figure 10:
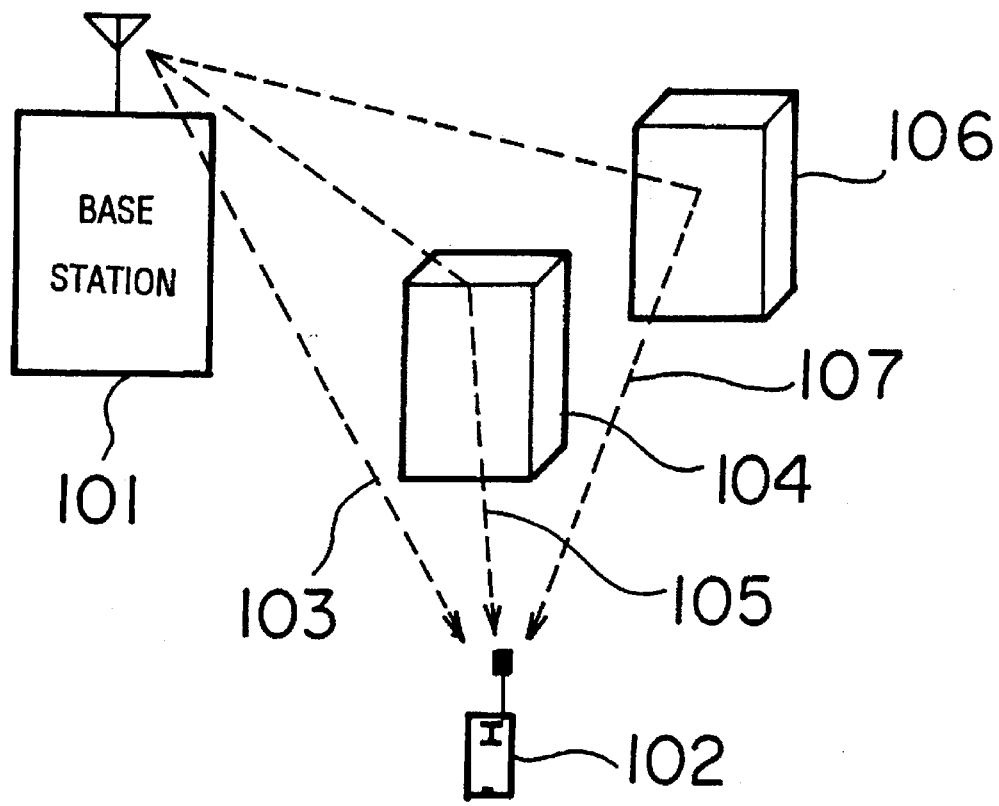
FIG. 10 is a diagram showing propagation pathes of a radio wave.

FIG. 9 shows the spectrum form of the DS/SS signal. Specifically, while a data signal with a bandwidth of (1/Td) has a spectrum SP1, the DS/SS signal obtained by subjecting the data signal to spread spectrum modulation has a broader spectrum SP2, as shown in the figure, and the bandwidth Bw (Hz) of the DS/SS signal is expressed by the following equation (6):

$$B_w = 1/T_c \quad (6)$$

Based on equation (5) or (6), the chip width Tc can be calculated.

By multiplying the chip width Tc by the light velocity C, as shown in equation (7) below, it is possible to obtain the spatial chip length Lc (m) of the DS/SS signal.

$$L_c = CT_c \quad (7)$$

When Bw=140 MHz and Td=1 Mbps, for example, the spatial chip length Lc is approximately 2.1 m, which provides sufficiently practical accuracy. Since the spatial chip length Lc represents the accuracy in measuring the distance between two points, the measurement accuracy can be further enhanced by using three or more base stations.

In the above embodiment, current time information may be first transmitted from each of the base stations 11 to 14 so that the mobile station 15 can roughly measure the distances based on the current time information, and then the chip number measurement is performed by the above-described method to increase the measurement accuracy.

As described above, according to the present invention, the mobile station receives signals transmitted from a plurality of base stations, and the position coordinates of the mobile station are obtained based on the predetermined synchronizing signal and identifying signal contained in each of the transmitted signals. A base station best suited for the communication with the mobile station can be easily determined based on the position coordinates, whereby hand-off control independent of the signal reception levels can be carried out.

Further, the moving speed of the mobile station is obtained based on time-based change in the position coordinates of the mobile station, and reception level which does not fluctuate with time due to fading is obtained based on the moving speed, thus permitting diversity reception control requiring short processing time.

Furthermore, the position and moving speed of the mobile station can be displayed for confirmation by the user of the mobile station, thus providing new added values for the user.

The foregoing is considered as illustrative only of the principles of the present invention. Further, since numerous modifications and changes will readily occur to those skilled in the art, it is not desired to limit the invention to the exact construction and applications shown and described, and accordingly, all suitable modifications and equivalents may be regarded as falling within the scope of the invention in the appended claims and their equivalents.

What is claimed is:

1. An apparatus for acquiring position of a mobile station in a mobile communication system which includes a plurality of base stations for transmitting signals each including a predetermined synchronizing signal synchronized with an identical clock and an identifying signal identifying an originating base station, and a mobile station receiving signals transmitted from the base stations, the apparatus comprising:

receiving means provided in the mobile station, for receiving signals transmitted from the base stations;

extracting means for extracting the predetermined synchronizing signal and the identifying signal contained in each signal transmitted from the base stations;

time difference detecting means for detecting a time difference between timing at which each of the predetermined synchronizing signals is extracted by said extracting means and predetermined timing;

base station coordinates detecting means for detecting position coordinate values of each of the base stations, based on the identifying signals from the base stations extracted by said extracting means;

mobile station coordinates calculating means for calculating position coordinates of the mobile station, based on the time difference detected by said time difference detecting means and the position coordinate values detected by said base station coordinates detecting means;

moving speed detecting means for detecting moving speed of the mobile station based on time-based change in the position coordinates calculated by said mobile station coordinates calculating means; and reception control means for controlling diversity reception of the mobile station based on the moving speed of the mobile station detected by said moving speed detecting means.

2. The apparatus according to claim 1, wherein said reception control means comprises:

first means for obtaining fluctuation pitch of a reception level based on the moving speed of the mobile station detected by said moving speed detecting means;

second means for determining an equalization time based on the fluctuation pitch obtained by said first means;

third means for equalizing the reception level within the equalization time determine by said second means to obtain an equalized reception level; and fourth means for controlling diversity reception of the mobile station based on the equalized reception level obtained by said third means.

* * * * *